United States Patent [19]

Richardson

[11] 4,304,419

[45] Dec. 8, 1981

[54] BOUNCE AND LOPE DAMPENING FOR TRACTOR SCRAPERS

[75] Inventor: Warner G. Richardson, Joliet, Ill.

[73] Assignee: Caterpillar Tractor Co., Peoria, Ill.

[21] Appl. No.: 50,381

[22] PCT Filed: Mar. 12, 1979

[86] PCT No.: PCT/US79/00149

§ 371 Date: Mar. 12, 1979

§ 102(e) Date: Mar. 12, 1979

[87] PCT Pub. No.: WO80/01893

PCT Pub. Date: Sep. 18, 1980

[51] Int. Cl.³ .............................................. B60D 7/02
[52] U.S. Cl. ................................. 280/460 R; 37/129; 280/489
[58] Field of Search .................. 280/489, 483, 460 R, 280/400; 37/129, 126 R, 132

[56] References Cited

U.S. PATENT DOCUMENTS

| | | | |
|---|---|---|---|
| 2,540,677 | 2/1951 | Kandt | 280/489 |
| 3,135,529 | 6/1964 | Conrad | 280/489 |
| 3,235,984 | 2/1966 | Wilson | 37/126 R |
| 3,311,389 | 3/1967 | Barton | 280/489 |
| 3,871,635 | 3/1975 | Unruh | 267/65 D |
| 3,953,040 | 4/1976 | Unruh | 280/6 H |
| 3,969,835 | 7/1976 | Erdelyan | 37/129 |
| 3,970,327 | 7/1976 | Dezelan | 280/6 H |
| 4,195,861 | 4/1980 | Philipponi | 280/489 |

*Primary Examiner*—John P. Silverstrim
*Attorney, Agent, or Firm*—Wegner, Stellman, McCord, Wiles & Wood

[57] ABSTRACT

A tractor-trailer unit (10,26) including a trailer (26) having wheels (30) at its rear and adapted to have its front supported by a hitch (16) to a tractor (10), a draft assembly (20) having spaced elongated arms (24) extending from the front rearwardly along the sides of the trailer, each arm being pivotally connected (34) to the trailer on a common horizontal axis intermediate the front and the rear, each arm further being jointed (54) intermediate its end to define front and rear sections (50,52) and dampeners (56,74,76) interconnecting the front and rear sections of each of the arms.

3 Claims, 5 Drawing Figures

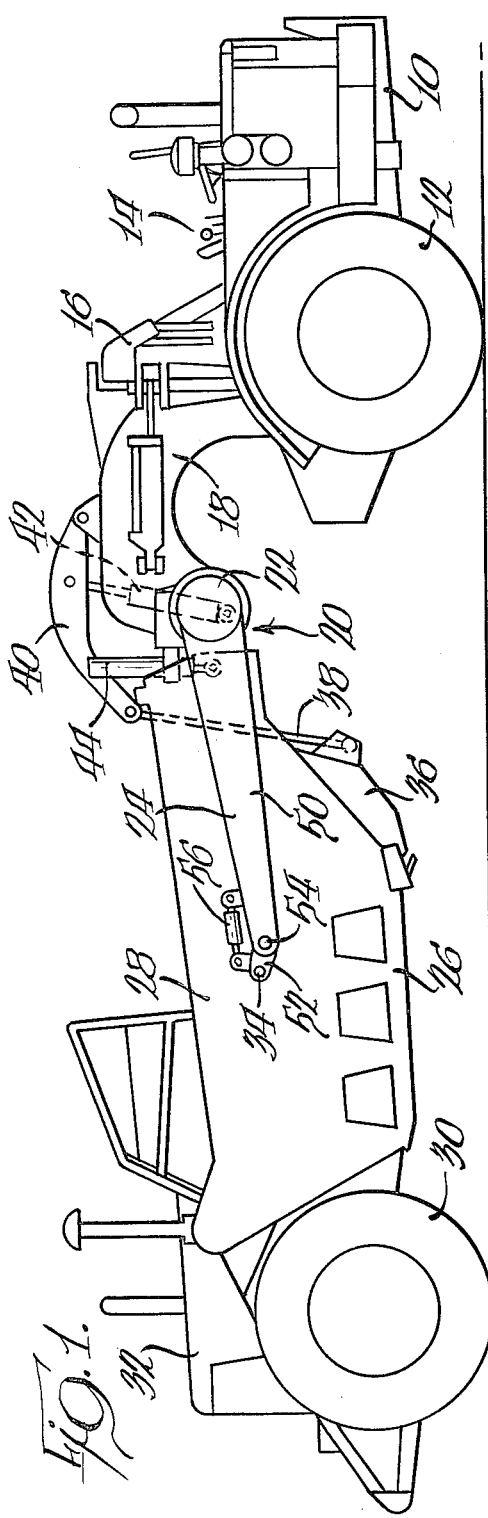
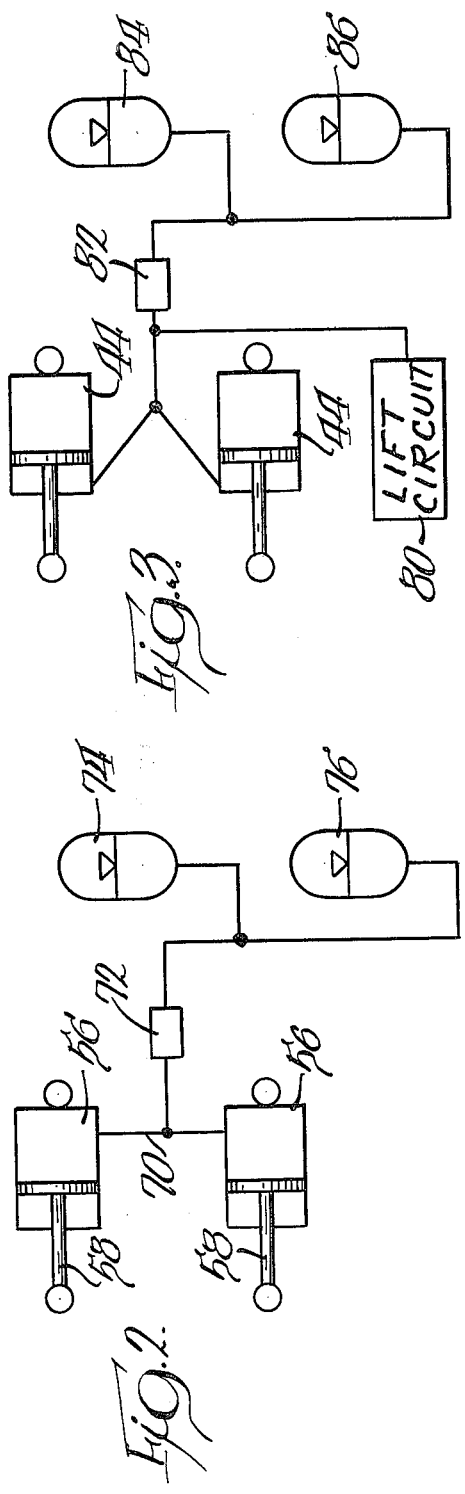

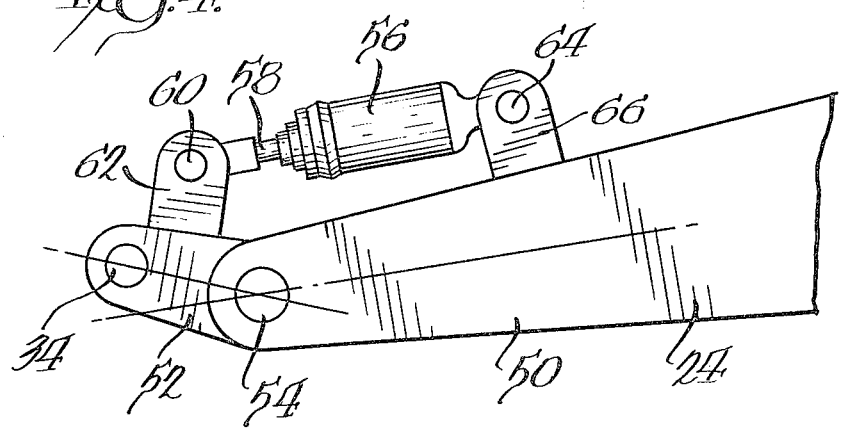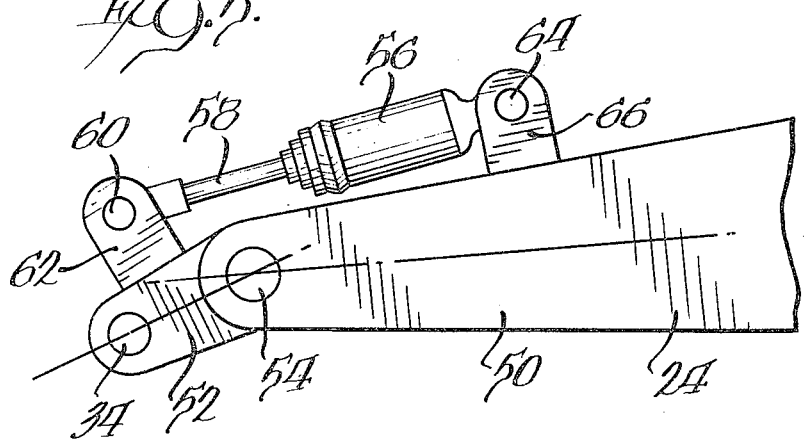

BOUNCE AND LOPE DAMPENING FOR TRACTOR SCRAPERS

DESCRIPTION

1. Technical Field

This invention relates to tractor trailer units as, for example, tractor scrapers and to dampening bounce and lope during the operation thereof.

2. Background Art

Prior art of possible relevance includes the following U.S. Pat. No. 3,135,529 issued June 2, 1964 to Conrad; U.S. Pat. No. 3,311,389 issued Mar. 28, 1967 to Barton et al; U.S. Pat. No. 3,871,635 issued Mar. 18, 1975 Unruh et al; U.S. Pat. No. 3,953,040 issued Apr. 27, 1976 to Unruh et al; U.S. Pat. No. 3,969,835 issued July 20, 1976 to Erdelyan; and U.S. Pat. No. 3,970,327 issued July 20, 1976 to Dezelan.

Many two axle tractor trailer units are subject to the drawback of considerable bounce and harmonic lope when being operated at anything other than low speeds. Typical of such units are so-called two axle tractor-scrapers. In use, such units are operated at relatively low speeds during filling and cutting operations which take place at different locations. The units are operated at relatively high speeds when travelling between the locations and their overall use is a repetitive cycle.

Because of the bounce and lope attendant movement between cut and fill locations, the operator of the unit is subject to considerable jarring which increases his fatigue level. Consequently, during transitting between cut and fill locations, the operator will typically retard the speed of the vehicle to minimize bounce and lope. This, in turn, increases cycle time which, in turn, considerably increases the cost of operation Moreover, the bounce and lope generated imposes severe loads on the haul road over which the vehicle is travelling which in turn increases the maintenance requirements of that road. The shocks generated during bounce and lope also impose severe stresses on the tractor scraper unit decreasing its life. And at the same time, because the haul road may be rapidly torn up, other vehicles using the road must traverse it at reduced speed and are subject to stresses generated by bumpy conditions which also shortens their useful life.

To avoid the foregoing problems, various cushioning or dampening schemes have been proposed for the purpose of minimizing or eliminating bounce and lope in such units. In some cases, dampening is applied at one of the vehicle axles. The above identified Conrad, Unruh et al '040 and Dezelan patents employ this approach.

In other cases, dampening is applied at the interconnection between the tractor and trailer unit as, for example, in the hitch between the two as, for example, shown by Barton et al, identified above. In still other instances, cushioning may be applied at a point of interconnection of a gooseneck and to the main trailer body as shown in the above identified patents to Erdelyan or Conrad.

Dampening at the axle, while satisfactory for minimizing bounce and lope, is not altogether satisfactory from the maintenance standpoint. The cushioning devices typically are underneath the vehicle and relatively unaccessible. Moreover, because they form part of the vehicle suspension, that part of the vehicle carrying them must have its entire weight supported by jacks or the like when the same are removed and/or reinstalled.

Constructions utilizing dampening devices in the hitch again are satisfactory as far as dampening bounce and lope is concerned. However, their presence in the hitch complicates the hitch structure by adding components thereto which are subject to large forces and which therefore are subject to breakage. And, when such occurs, the complicated hitch construction is difficult to service.

The use of cushioning devices at the gooseneck also results in a relatively complicated structure where access to the components can be difficult thereby impeding proper maintenance.

DISCLOSURE OF THE INVENTION

The present invention is directed to overcoming one or more of the problems as set forth above.

According to the present invention, there is provided a tractor-trailer unit including a trailer having wheels at its rear and adapted to have its front supported by a hitch to the tractor. A draft assembly having spaced, elongated arms extends from the front rearwardly along the sides of the trailer. Each of the arms is pivotally connected to the trailer on a common horizontal axis intermediate the front and the rear of the trailer. Each of the arms further is jointed intermediate its ends to define front and rear sections and dampening means interconnect one of the sections of each arm and another part of the unit for dampening relative movement between the section to which it is connected and the trailer. As a consequence of this construction, the dampening means may be located remote from the hitch or the gooseneck to provide for easy servicability. At the same time, dampening at the axle can be avoided if desired.

Other objects and advantages will become apparent from the following specification taken in connection with the accompanying drawings.

BRIEF DESCRIPTION OF DRAWINGS

FIG. 1 is a side elevation of a tractor-trailer unit made according to one embodiment of the invention;

FIG. 2 is a hydraulic schematic of a preferred form of dampening means;

FIG. 3 is a hydraulic schematic of an additional dampening means which may be optionally employed if desired;

FIG. 4 is an enlarged, fragmentary elevational view illustrating the dampening means in one extreme position of movement;

FIG. 5 is a view similar to FIG. 4 but showing the dampening means in another extreme position of movement.

BEST MODE FOR CARRYING OUT THE INVENTION

An exemplary embodiment of a tractor-trailer unit made according to the invention is illustrated in FIG. 1 and is seen to include a tractor 10 having a pair of wheels 12 (only one of which is shown) on a single axle which engage the underlying terrain. An operator area 14 is provided on the tractor 10 along with suitable controls for an engine therein which drives the wheels 12. Near the rear of the tractor 10, there is provided a hitch 16 which may be of conventional construction which in turn is connected to a conventional gooseneck 18 which is directed rearwardly.

The gooseneck 18 supports a draft assembly, generally designated 20, including a horizontally elongated cross member 22. Elongated draft arms 24, two in number, extend from opposite ends of the cross member 22 and rearwardly therefrom about the sides of a trailer 26. The draft arms 24 are pivoted to opposite ends of the cross member 22 for rotation about a horizontal axis which is traverse to the direction of movement to the assembly. As illustrated in FIG. 1, the trailer 26 includes a scraperbowl 28 which terminates at its rear in an axle (not shown) having two rear wheels 30 (only one of which is shown). If desired, though not necessary, the trailer 26 may mount an engine 32 for driving the wheels 30.

The trailer 26 is pivoted about a common horizontal axis defined by trunnions 34 to the rearwardmost ends of the draft arms 24. Consequently, it will be appreciated that the forward end of the trailer 26 can move upwardly or downwardly about the axis of the axle journalling wheels 30.

The forward end of the bowl 26 can be selectively opened or closed by an apron 36 pivotally secured to the trailer 26 by means not shown. A link 38 is pivoted to the apron 36 and to a link 40 pivoted on the gooseneck 18 and a hydraulic cylinder 42 interconnects the link 40 and a part of the gooseneck 18. Thus, through appropriate operation of the cylinder 42, the link 40 may be raised from the position illustrated to open the apron 36 as desired.

For the purpose of controlling the attitude of the front end of the trailer 26 with respect to the tractor 10, a pair of hydraulic cylinders 44 (only one of which is shown in FIG. 1) having their head ends suitably mounted on the gooseneck 18 and their rods pivotally connected to the forward end of the trailer 26. Thus, the trailer 26 can be selectively moved from the transport position illustrated in FIG. 1 to lowered positions for cutting and filling in a conventional fashion.

As best seen in FIGS. 1, 4 and 5, each of the draft arms 24 is jointed intermediate its ends so as to define a front section 50 and a rear section 52. The rear section 52 is pivoted by the trunnion 34 to the trailer 26. The joint between the sections 50 and 52 is provided by a horizontal pivot 54, the pivots 54 for each of the arms 24 being aligned and being generally transverse to the direction of movement of the vehicle.

According to the invention, dampening means are employed for dampening relative movement between one of the sections 50 and 52 and the trailer 26 and specifically, for dampening relative movement between the two sections 50 and 52. As illustrated in FIG. 4, such dampening means are in the form of single acting hydraulic cylinders 56 having their rod ends 58 pivotally connected by pins 60 to corresponding upstanding ears 62 on the rear section 52 of the arms 50. The head ends of each of the cylinders 56 are pivotally connected as by pins 64 to upstanding ears 66 on the front sections 50 of the arms 24.

As seen in FIG. 2, hydraulic conduits 70 are connected to be in fluid communication with the head ends of the cylinders 56 and extend through a conventional lockout circuit 72 to a pair of gas accumulators 74 and 76. The accumulator 74 may be a low pressure accumulator while the accumulator 76 may be a high pressure accumulator so as to provide for dampening regardless of whether the trailer 26 is loaded or unloaded in a conventional manner.

In some instances, dampening in addition to that provided by the cylinders 56 may be desired and this in turn can be achieved through the use of the means illustrated in FIG. 3. In particular, the bowl cylinders 44 have their rod ends connected to a conventional hydraulic lift control circuit 80 by which the rods thereof can be retracted to elevate the front end of the trailer 26 with respect to the tractor 10. The rod ends of the cylinders 44 are also connected through a conventional lockout circuit 82 similar to the lockout circuit 72 to high and low pressure accumulators 84 and 86, respectively.

INDUSTRIAL APPLICABILITY

When the tractor-trailer unit is in transit from one location to another, and harmonic forces that tend to generate bounce and lope occur, the trailer 26 will tend to oscillate with respect to the tractor 10 about the axis of the cross member 22 of the draft assembly 20. This in turn will tend to cause relative movement between the front and rear sections 50 and 52 of the draft arms 24 about pivot pin 54 as well as relative movement between the rear sections 52 of the draft arms 24 about the pivots or trunnions 34. Unchecked, such relative movement would soon result in undesirably high amplitudes of bounce and roll giving rise to the problems mentioned earlier. However, such movement is checked by the dampening action provided by the cylinders 56 and accumulators 74 and 76. Where the cylinders 44 are also connected to accumulators such as the accumulators 84 and 86, they too will tend to check such movement to dampen the same. Consequently, bounce and lope is minimized or avoided altogether as are the problems connected therewith.

It will be appreciated that the disposition of the cylinders 56 at the locations described insures that they are readily accessible for maintenance purposes and do not unnecessarily complicate other parts of the structure such as the hitch 16 or the gooseneck 18 and mechanical components in its environs. Removal of the cylinders 56 for maintenance purposes is easily facilitated since no jacks are required, the maintenance of the proper attitude of the trailer 26 with respect to the draft arms being easily controlled through appropriate use of the cylinders 44 which are required in any event.

Similarly, when used, the accumulators 84 and 86 provide for additional dampening without the need for additional components other than the accumulators themselves and their interconnecting hydraulic lines, making use of the bowl cylinders 44 which thereby provide a dual function.

I claim:
1. A trailer unit comprising:
   a trailer (26) having wheels (30) at its rear, and a front;
   a draft assembly (20) having spaced elongated arms (24) extending from the front rearwardly along the sides of said trailer, each said arm having a rear section pivotally connected to the trailer (at 34) on a common horizontal axis intermediate the front and the rear of said trailer, each said arm further being jointed (at 54) intermediate its ends to define a front (50) and said rear (52) section, said draft assembly being adapted to be connected to a tractor; and
   dampening means (56,74,76) interconnecting the front and rear sections of each of said arms.
2. The trailer unit of claim 1 wherein said dampening means include hydraulic cylinders (56) having their opposite ends connected (at 60,64) respectively to the front and rear sections of said arms and an accumulator (74,76) in fluid communication with said cylinders.
3. The trailer unit of claim 2 wherein said arms are jointed intermediate their ends by pivots (54) and said hydraulic cylinders have their opposite ends connected to the front and rear sections of said arms on opposite sides of said pivots.

* * * * *